United States Patent
Sawyer

(10) Patent No.: US 8,637,768 B2
(45) Date of Patent: Jan. 28, 2014

(54) FLEX DUCT

(75) Inventor: Lee Myron Sawyer, Everett, WA (US)

(73) Assignee: The Boeing Company, Chicago, IL (US)

( * ) Notice: Subject to any disclaimer, the term of this patent is extended or adjusted under 35 U.S.C. 154(b) by 1356 days.

(21) Appl. No.: 12/147,742

(22) Filed: Jun. 27, 2008

(65) Prior Publication Data

US 2009/0321105 A1  Dec. 31, 2009

(51) Int. Cl.
*F16L 11/12* (2006.01)
*H01B 7/00* (2006.01)
*H01B 17/00* (2006.01)
*F16L 11/00* (2006.01)

(52) U.S. Cl.
USPC ................ 174/47; 138/120; 138/155

(58) Field of Classification Search
USPC ............... 174/47; 138/120, 121, 155
See application file for complete search history.

(56) References Cited

U.S. PATENT DOCUMENTS

| | | | | |
|---|---|---|---|---|
| 4,167,645 A | * | 9/1979 | Carey | 174/47 |
| 4,310,946 A | * | 1/1982 | Baker et al. | 15/363 |
| 4,330,811 A | * | 5/1982 | Bordner | 361/212 |
| 4,473,923 A | * | 10/1984 | Neroni et al. | 15/377 |
| 4,860,644 A | | 8/1989 | Kohl et al. | |
| 5,738,148 A | | 4/1998 | Coral et al. | |
| 6,113,155 A | | 9/2000 | Beirens | |
| 6,279,967 B1 | * | 8/2001 | Proctor et al. | 285/340 |
| 6,648,748 B1 | | 11/2003 | Ferlin | |
| 2005/0208246 A1 | * | 9/2005 | Aisenbrey | 428/36.9 |

\* cited by examiner

*Primary Examiner* — Justin Jonaitis
(74) *Attorney, Agent, or Firm* — Yee & Associates, P.C.

(57) ABSTRACT

An apparatus may comprise a wire frame, a material, and mating connectors. The wire frame is covered by the material to form a flexible duct having a first end and a second end. A first mating connector may be electrically connected to the wire frame and attached to the material at the first end. The first mating connector may be capable of being coupled to a first complementary mating connector to form a mechanical connection and an electrical connection. A second mating connector may be electrically connected to the wire frame and attached to the material at the second end. The second mating connector may be capable of being coupled to a second complementary mating connector to form the mechanical connection and the electrical connection.

20 Claims, 8 Drawing Sheets

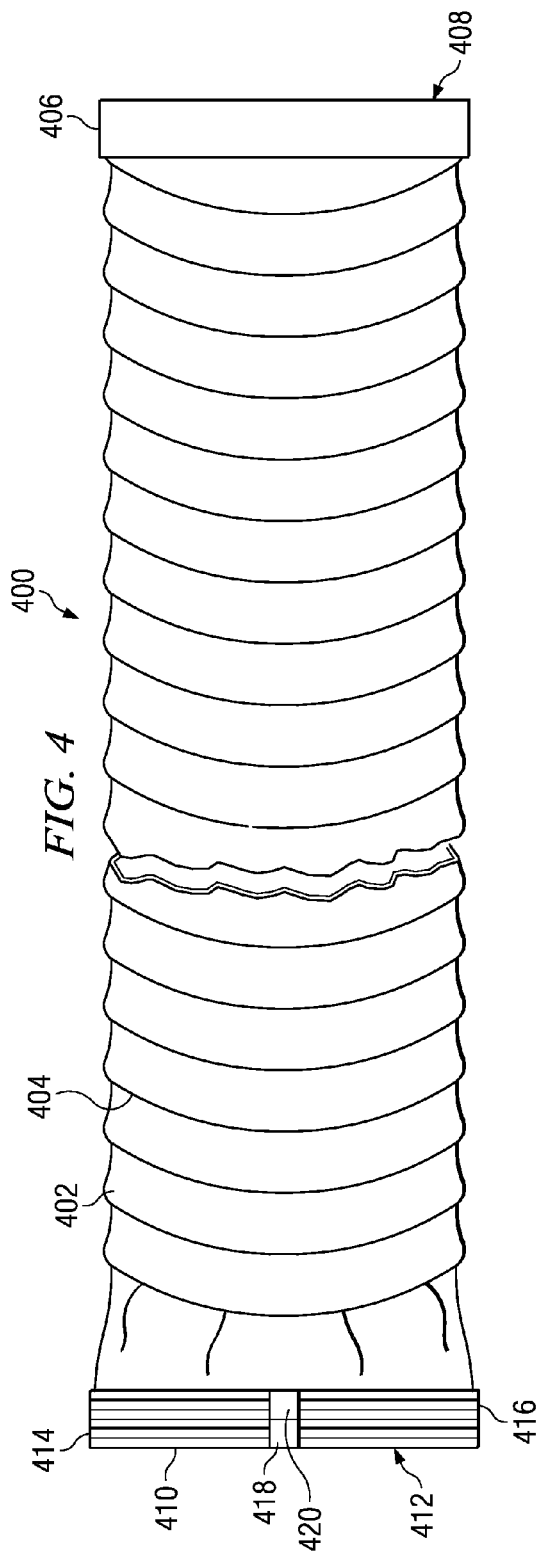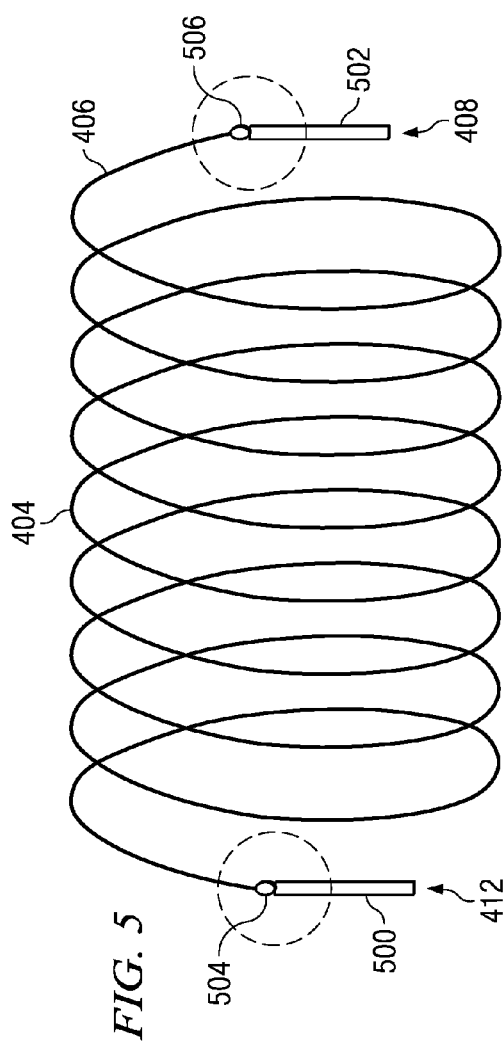

FLEX DUCT

BACKGROUND INFORMATION

1. Field

The present disclosure relates generally to manufacturing and in particular to managing vapors in an interior area. Still more particularly, the present disclosure relates to a method and apparatus for an exhaust system to remove flammable/explosive vapors.

2. Background

In manufacturing aircraft, many different operations may be performed to produce an aircraft ready for service. These operations include, for example, without limitation, manufacturing an airframe, skin panels, ailerons, and other suitable components. Additionally, these operations also may include installing electrical systems, hydraulic systems, aircraft seats, monuments, and other suitable items. These components may be bolted, joined, bonded, or otherwise attached to each other.

One operation that may be performed involves painting the exterior of the aircraft. Although the different parts may be painted and/or coated prior to joining or assembling the parts, other components such as, for example, without limitation, bolts used to join parts may require painting after assembly. Additionally, painting operations in the interior of the aircraft also may occur to provide, without limitation, desired aesthetics or corrosion resistance.

Painting and/or other operations in an interior of an aircraft may result in various flammable/explosive vapors and/or mists being generated. The overspray can contaminate other interior surfaces. An ignitable vapor may be a flammable vapor or an explosive vapor. In these examples, the code requirements may be, for example, without limitation, National Fire Protection Association (NFPA) codes and/or standards.

With these types of situations, exhaust systems may be used to ventilate and/or remove these vapors and/or mists from the interior of the aircraft. A flexible duct may be used to remove vapors and/or mists from a portion of an aircraft in which the vapors may be contained with or without containment curtains or local exhaust hoods/devices to entrain the vapors/mists and extract the vapor/mists to the exterior of the aircraft.

These vapors and/or mists may be filtered and otherwise processed to remove flammable components from the air. The processed air may be allowed to recirculate under code requirements or exhausted to the outside of the facility following proper procedures. Code requirements may be, for example, without limitation, those from the National Fire Protection Association and other suitable entities.

Depending on the location in which vapors and/or mists may be generated in the aircraft and the location of the doors or other portals from the aircraft exterior into the interior of the aircraft, flexible ducts of various lengths may be needed. These flexible ducts may be, for example, without limitation, forty feet, fifty feet, eighty feet, or some other suitable length appropriate for production personnel convenience of assembly.

The flexible ductwork may be required by National Fire Protection Association codes to maintain conductivity between sections and to a grounded ventilation/exhaust system for dissipating static electricity charges accumulating in the exhaust system. Conductive flexible ductwork also may be required by code to be static dissipative of static charge to an approved grounding location, such as, for example, without limitation, grounded equipment or building ground location. Conductive flexible duct work may not require the same low resistance conductivity as in wiring used for other purposes.

In many situations, long lengths of flexible ducts may be difficult to handle. For example, without limitation, a duct that may be sixty feet long may be difficult to move into place within an aircraft. Different lengths of flexible ducts may be used to reduce some of the handling difficulty. This type of solution, however, may increase the cost and may interrupt or delay operations in manufacturing aircraft in the event that a duct having an appropriate length is unavailable.

Pigtails have been used to connect flexible ducts together and may conform to codes and/or regulations. Pigtails, however, may not be a practical solution for maintaining static discharge conductance. A pigtail may be a wire used between duct sections. Pigtails, however, may be inconvenient to production personnel and may have inconsistent conductivity and may be prone to repeated failure and/or breakage.

Therefore, it would be advantageous to have a method and apparatus that overcomes the problems described above.

SUMMARY

In one advantageous embodiment, an apparatus may comprise a wire frame, a material, and mating connectors. The wire frame is covered by the material to form a flexible duct having a first end and a second end. A first mating connector may be electrically connected to the wire frame and attached to the material at the first end. A second mating connector may be electrically connected to the wire frame and attached to the material at the second end.

In another advantageous embodiment, a method may be present for forming an airway. A length may be identified for the airway. A plurality of flexible ducts may be selected for the airway. Each flexible duct in the set of flexible ducts may comprise a wire frame; a material covering the wire frame to form a flexible duct having a first end and a second end; a first mating connector may be electrically connected to the wire frame and attached to a material at the first end and, wherein the first mating connector may be capable of being coupled to a first complementary mating connector to form a mechanical connection and an electrical connection; and a second mating connector may be electrically connected to the wire frame and attached to the material at the second end, wherein the second mating connector may be capable of being coupled to a second complementary mating connector to form the mechanical connection and the electrical connection. The first mating connector for a first flexible duct in the plurality of flexible ducts may be connected to the first complementary mating connector in a second flexible duct in the plurality of flexible ducts until all of the plurality of flexible ducts is connected to form the airway.

In still another advantageous embodiment, a method may be provided for moving contaminated air. An airway to an interior area may be formed. The airway may comprise a plurality of flexible ducts connected to each other, wherein the flexible duct in the plurality of flexible ducts may have a first mating connector electrically connected to a wire frame in the flexible duct and attached to the material at a first end of the flexible duct and a second mating connector electrically connected to the wire frame and attached to the material at a second end of the flexible duct. The airway may be capable of dissipating static electricity. The contaminated air may be moved away from the interior area through the airway.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is a diagram of a flexible duct in accordance with an advantageous embodiment;

FIG. 5 is a diagram illustrating a helix in accordance with an advantageous embodiment;

DETAILED DESCRIPTION

Figure 1:
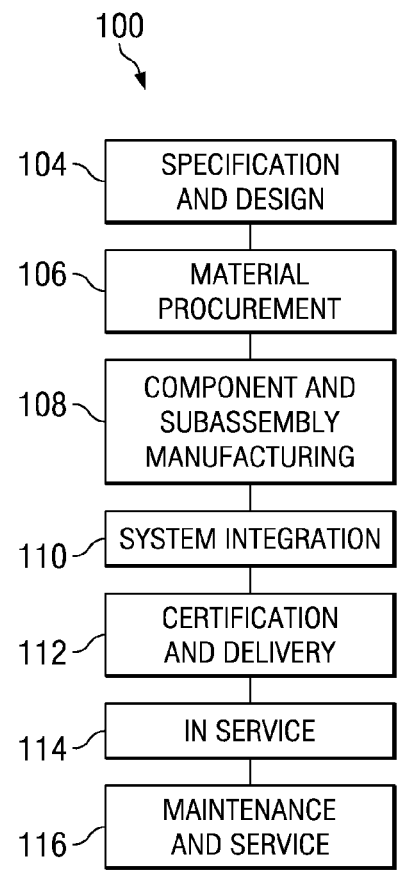
FIG. 1 is a flow diagram of aircraft production and service methodology in which an advantageous embodiment may be implemented.
Figure 2:
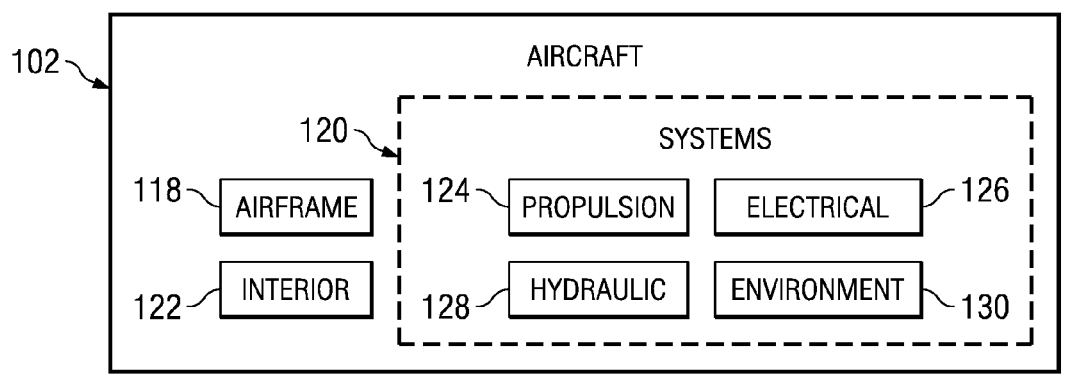
FIG. 2 is a block diagram of an aircraft in accordance with an advantageous embodiment.

Referring more particularly to the drawings, embodiments of the disclosure may be described in the context of an aircraft manufacturing and service method 100 as shown in FIG. 1 and aircraft 102 as shown in FIG. 2. During pre-production, exemplary method 100 may include specification and design 104 of aircraft 102 and material procurement 106.

During production, component and subassembly manufacturing 108 and system integration 110 of the aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 2, aircraft 102 produced by exemplary method 100 may include airframe 118 with plurality of systems 120 and interior 122. Examples of high-level systems 120 include one or more of propulsion system 124, electrical system 126, hydraulic system 128, and environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to component and subassembly manufacturing 108 may be fabricated or manufactured in a manner similar to components or subassemblies produced while aircraft 102 is in service. Also, one or more apparatus embodiments, method embodiments, or a combination thereof may be utilized during production stages 108 and 110, for example, by substantially expediting assembly of or reducing the cost of aircraft 102.

Similarly, one or more of apparatus embodiments, method embodiments, or a combination thereof may be utilized while aircraft 102 is in service, for example and without limitation, to maintenance and service 116. In one illustrative example, advantageous embodiments may be implemented during component and subassembly manufacturing 108, system integration 110, and maintenance and service 116 when painting or other operations generating flammable vapors and/or mists are performed in an interior portion of aircraft 102.

The different advantageous embodiments take into account that currently available flexible ducts may be difficult to handle when using long lengths in an interior area, such as, for example, without limitation, an interior of an aircraft. The different advantageous embodiments recognize and take into account that with flammable/explosive vapors and/or over spray mists, it may be desirable and necessary to remove the vapors and mist from the interior of the aircraft to prevent or reduce undesirable possibilities.

Ignitable contaminants may be, for example, flammable vapors, explosive vapors, flammable mists, explosive mists, or other ignitable materials that may be present in the air. An exhaust system may be required to dissipate static electricity that may be present within an interior in which flammable vapors and/or mists may be generated or generated in the exhaust process.

A flexible duct may dissipate static electricity that may build up in the interior area and/or within the flexible duct. A flexible duct may include a wire frame that may be used to dissipate static electricity. In some advantageous embodiments, it may be desirable to connect different lengths of flexible ducts to each other to form a duct or airway that may have a needed length to reach from the ventilation unit to the area in which vapors and/or mists may need to be removed.

With this type of flexible duct system, different sections of the flexible duct may be moved into the desired locations. Those sections may then be connected to each other to connect an area in which vapors and mist may be generated to an exterior area in which those vapors and mists may be processed and exhausted in a manner that may reduce and/or eliminate emission of those vapors and mists.

One manner in which the different advantageous embodiments may dissipate static electricity with separate flexible ducts being joined to each other may include connecting pigtails directly at different ends of the flexible duct. In these examples, a pigtail may be a conductive element. These pigtails may then be connected to each other when joining the flexible ducts to form an airway. The different advantageous embodiments take into account that this connecting of pigtails to each other may be time consuming and may increase the time and difficulty needed to assembly a desired length from multiple flexible ducts.

Thus, the different advantageous embodiments provide a method and apparatus for forming a desired length of flexible duct from a plurality of flexible ducts. Each flexible duct may have a wire frame and a suitable material covering the wire frame to form a flexible duct having a first end and a second end. A first mating connector may be electrically connected to the wire frame and attached to the conductive material at the first end. In the different advantageous embodiments, this wire frame may take the form of a wire helix frame. The wire helix frame may be electrically connected to the conductive material by any suitable method, such as with flexible braided wires on each end, which is stitched into the conductive material, to maintain the static conductance between each connector ends of the flex duct.

This first mating connector may be capable of being coupled to a complimentary mating connector on another flexible duct to form a mechanical connection and an electrical connection. In these examples, the electrical connection may be a statically dissipated electrical connection and in other advantageous embodiments, the electrical connection may be a conductive connection suitable for transmitting electrical currents. Of course, either type of electrical connection may be used in the different advantageous embodiments.

The flexible duct also may include a second mating connector that may be electrically connected to the wire frame and attached to the material at the second end. This material also may be a statically conductive material in these examples. The second mating connector may be capable of being coupled to a second complimentary mating connector on another flexible duct to form the mechanical connection and the electrical connection. Increased time and complexity in connecting flexible ducts to each other may be reduced with the use of mating connectors.

Figure 3:
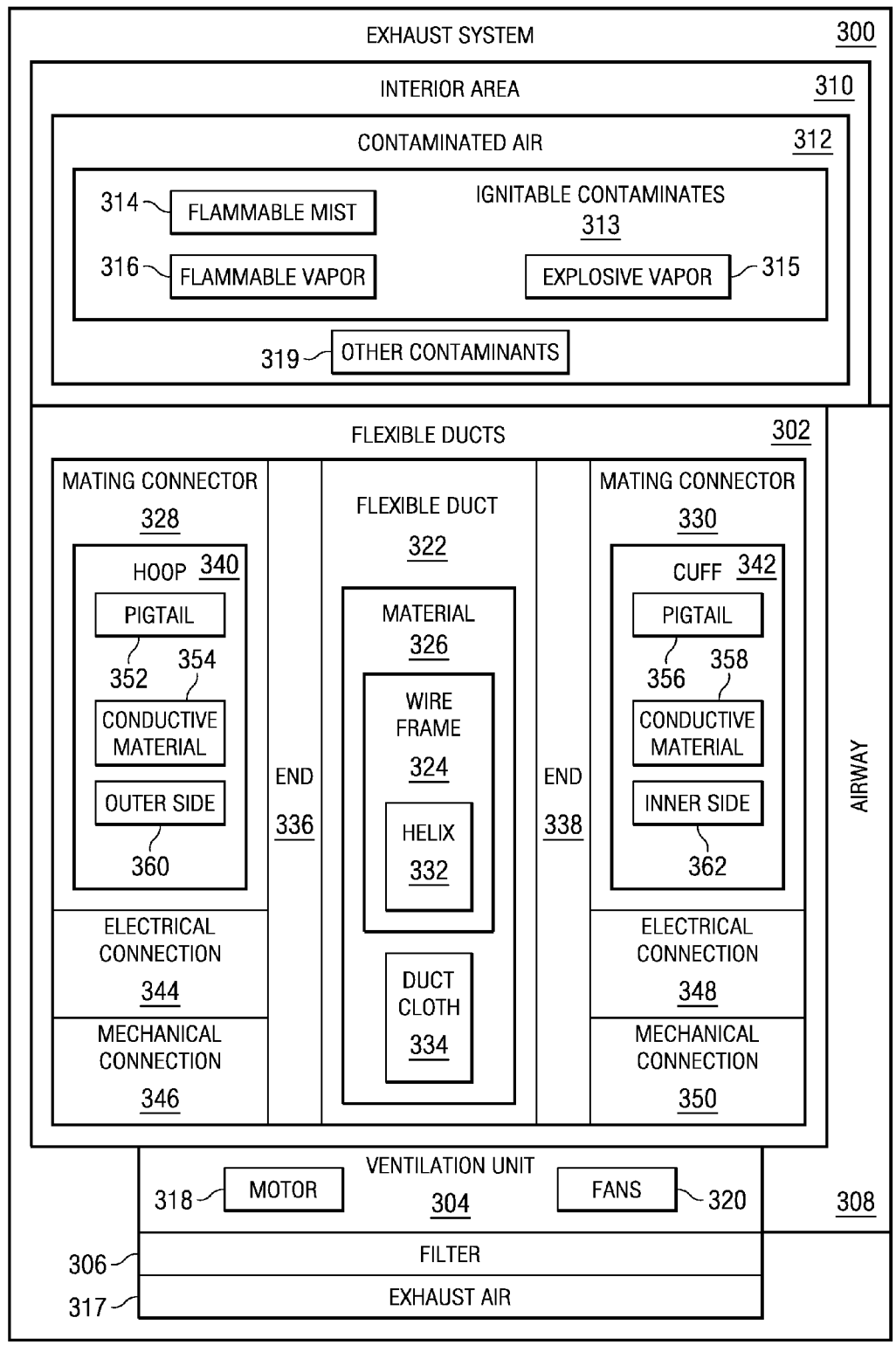
FIG. 3 is a diagram illustrating an exhaust system in accordance with an advantageous embodiment.

With reference now to FIG. 3, a diagram illustrating an exhaust system is depicted in accordance with an advantageous embodiment. In this example, exhaust system 300 includes flexible ducts 302, ventilation unit 304, and filter 306 or a dedicated central exhaust system that exhausts to the outside of the facility. Two or more of flexible ducts 302 may be connected to each other to form airway 308 from interior area 310 to ventilation unit 304. In other words, airway 308 may be a flexible duct formed from the joining of a plurality of flexible ducts within flexible ducts 302. The number of flexible ducts from flexible ducts 302 used to form airway 308 may vary depending on the length of airway 308.

Ventilation unit 304 draws contaminated air 312 from interior area 310 through airway 308 for processing. Ventilation unit 304 may also be referred to as an exhaust unit. Ventilation unit 304 may be any device that may pull or move air. Contaminated air 312 may include ignitable contaminants 313. Ignitable contaminants 313 may include, for example, without limitation, flammable mist 314, flammable vapor 316, and explosive vapor 315 and other types of contaminates that may be ignited. Of course, contaminated air 312 may include other contaminants 319 that may be undesirable within interior area 310.

Other contaminants 319 may include, for example, mists that may be hazardous to health from corrosion preventative constituents and paint or primers, volatile organic compounds, or surface contamination instances. Volatile organic compounds may be hazardous in elevated concentrations. These types of compounds include, for example, nattha, methyl ethyl ketone, paint thinner, methyl propyl ketone, isocyanides, and other similar compounds. Surface contamination nuisances may be contaminates that may be undesirable on surfaces of areas within interior area 310.

Contaminated air 312 may be filtered using filter 306 to form exhaust air 317. Exhaust air 317 may be, for example, without limitation, exterior exhaust air or recirculated air. Flammable mist 314 and/or flammable vapor 316 may be removed from exhaust air 317. In this example, ventilation unit 304 may include motor 318 and fans 320 to draw contaminated air 312 through airway 308 formed by flexible ducts 302 through filters 306.

In these examples, flexible ducts 302 may be a set of flexible ducts. A set, as used herein, may be one or more items. For example, a set of flexible ducts is one or more flexible ducts. Multiple ducts within flexible ducts 302 may be connected to each other to form airway 308 with a desired length that reaches from interior area 310 to ventilation unit 304. In some embodiments, airway 308 may be a single flexible duct, such as flexible duct 322.

With the ability to attach individual ducts to each other in flexible ducts 302, the different advantageous embodiments may reduce the difficulty and time needed to set up exhaust system 300, as compared to using a single flexible duct of the same length and in the static electrical connection method between duct sections for production personnel convenience of assembly. In these examples, airway 308 also may provide a capability to reduce and/or prevent a build-up of static electricity.

In the different advantageous embodiments, flexible duct 322 is an example of one flexible duct within flexible ducts 302. Flexible duct 322 may include, for example, without limitation, wire frame 324, material 326, mating connector 328, and mating connector 330.

Wire frame 324 may provide a frame or structure around which material 326 may be placed. Wire frame 324 may take the form of helix 332 in these examples. Of course, wire frame 324 may use any architecture and/or configuration that may provide a capability to move contaminated air 312 to ventilation unit 304 when connected to other ducts in flexible ducts 302 to form airway 308.

Material 326 may be, for example, without limitation, duct cloth 334. Duct cloth 334 may be any cloth or other fabric material that may allow for contaminated air 312 to be moved through flexible duct 322 in a manner that may reduce or prevent contaminated air 312 from escaping or leaving flexible duct 322 while traveling to ventilation unit 304.

Mating connector 328 may be located on end 336 of flexible duct 322, while mating connector 330 may be located on end 338 of flexible duct 322. In these examples, mating connector 328 and mating connector 330 may take the form of a male and female connector. Mating connector 328 may be a male connector, while mating connector 330 may be a female connector.

Mating connector 328 may be hoop 340, while mating connector 330 may be cuff 342. Hoop 340 and cuff 342 may be complimentary connectors in these illustrative examples. For example, hoop 340 may be inserted into cuff 342. Mating connector 328 provides electrical connection 344 and mechanical connection 346. Mating connector 330 provides electrical connection 348 and mechanical connection 350.

Electrical connection 344 and electrical connection 348 may provide connections with wire frames and other flexible ducts to dissipate and/or prevent static electricity from building up. Mechanical connection 346 and mechanical connection 350 may provide a capability to attach flexible ducts 302 and other flexible ducts 302 to each other.

In this illustrative example, hoop 340 includes pigtail 352 and conductive material 354. Cuff 342 includes pigtail 356 and conductive material 358. In these examples, conductive material 354 has a conductive side on outer side 360, while cuff 342 has a conductive side of conductive material 358 on inner side 362. In this manner, inserting cuff 342 into hoop 340 provides electrical connection 344 and electrical connection 348.

In these examples, the electrical connections may be static electrical connections. Of course, in actual implementation, hoop 340 is mated with a cuff from a different flexible duct within flexible ducts 302, and cuff 342 may be connected to a third flexible duct within flexible ducts 302.

The illustration of exhaust system 300 in FIG. 3 is not meant to imply architectural or physical limitations in the manner in which the different advantageous embodiments may be implemented. For example, in some advantageous embodiments, additional ventilation units in addition to ventilation unit 304 may be implemented. Further, in other advantageous embodiments, additional airways in addition to airway 308 may be present. Also, wire frame 324 may take other forms than helix 332.

With reference now to FIG. 4, a diagram of a flexible duct is depicted in accordance with an advantageous embodiment. In this example, flexible duct 400 is an example of one implementation of flexible duct 322 in FIG. 3. This example is not meant to limit the manner in which other flexible ducts may be implemented. Other flexible ducts may have other types of materials, construction, and/or dimensions.

As illustrated, flexible duct 400 may be formed from material 402 placed over helix 404. In this example, flexible duct 400 may have a length of around twenty feet when extended. Of course, other lengths may be employed depending on the particular implementation.

Flexible duct 400 also includes hoop end 406 at end 408 and cuff end 410 at end 412. Hoop end 406 and cuff end 410 are examples of mating connectors, such as, for example, without limitation, mating connectors 328 and 330 in FIG. 3. Hoop end 406 may be placed into a cuff from another flexible duct, while cuff end 410 may receive a hoop of yet another flexible duct. In this manner, multiple flexible ducts, such as flexible duct 400, may be attached to each other to form a desired length for an airway.

In these examples, hoop end 406 may have a similar diameter to cuff end 410 allowing cuff end 410 to engage hoop end 406. Cuff end 410 may be, for example and without limitation, around six inches long and may be connected to the flexible duct by reducing a diameter through strap 414, strap 416, buckle 418, and buckle 420. Strap 414 and strap 416 may be tightened to connect hoop end 406 to a cuff on another flexible duct. Buckle 418 and buckle 420 may be used to hold strap 414 and strap 416 in place when cuff end 406 is connected to a hoop, such as hoop end 406, on the other end of another flexible duct. Other methods and apparatus of connecting the hoop and the cuff are within the contemplation of those with skill in the art.

In the different advantageous embodiments, cuff end 410 may be electrically connected to helix 404. The type of connection used may be described in more detail in FIG. 5 below.

Hoop end 406 may be, for example and without limitation, around two inches long. Hoop end 406 and cuff end 410 may be electrically connected to helix 404. Hoop end 406 may provide an electrical connection to a cuff end on another flexible duct when connected to that cuff end. Cuff end 410 may be electrically connected to another hoop end when a mechanical connection is created between those mating components.

With reference now to FIG. 5, a diagram illustrating a helix is depicted in accordance with an advantageous embodiment. In this example, helix 404 is shown without material 402. In these examples, helix 404 may be, for example, without limitation, a steel cable, a titanium cable, an aluminum cable, an alloy cable, or some other suitable electrically conductive cable and/or wire. In this particular illustration, helix 404 may be formed from a ¼ inch diameter braided wire rope to form a steel cable hoop, which is a stiffening end of the wire helix configuration extending from end 408 to end 412.

Of course, other types of conductive materials may be used to form helix 404. For example, helix 404 may be formed from other conducting material such as, for example, without limitation, titanium, aluminum, or other suitable electrically conductive metallic alloys. Helix 404 may extend into hoop end 406 to provide resistance to buckling when cuff end 410 is tightened around hoop end 406.

As can be seen, helix 404 may be connected to pigtail 500 and pigtail 502 through cable connector 504 and cable connector 506, respectively all while maintaining conductivity through the helix to the conductive material flexible duct ends in the manufacturing of this assembly. In these examples, pigtail 500 may be located within hoop end 406 in FIG. 4, while pigtail 502 may be located within cuff 410 in FIG. 4.

Pigtail 500 and pigtail 502 may take the form of wire braided to form a flat material and/or tubular sheet for stitching tight and into the conductive material. In the depicted examples, pigtail 500 and pigtail 502 may be formed from tinned wire flat copper pigtails and each may be around thirteen inches long. Tinning may be performed for corrosion prevention of the braided copper wire in these examples. In other advantageous embodiments, pigtail 500 and pigtail 502 may be constructed using other materials and/or may have other lengths and dimensions. Further, other types of connectors other than pigtails also may be employed depending on the particular embodiment.

Connector 504 and connector 506 may be, for example, without limitation, a swage type cable connector in which helix 404 and pigtails 500 and 502 are inserted into the connectors, with the connectors then being crimped to form an electrical and mechanical connection. Connector 504 and connector 506 may be constructed from any conductive material that may provide a physical connection between helix 404 and pigtails 500 and 502.

Figure 6:
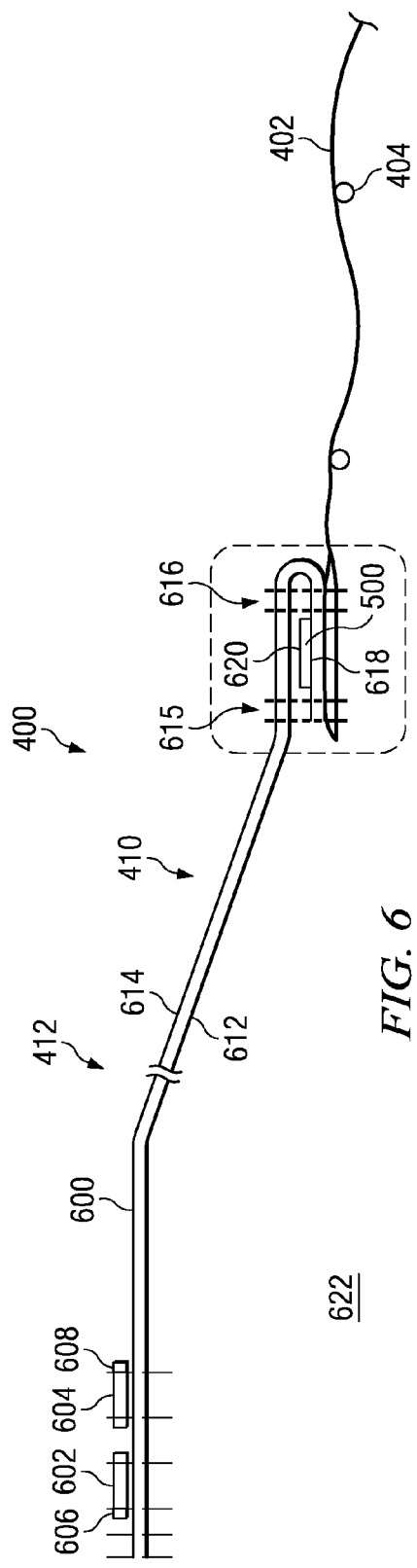
FIG. 6 is a diagram illustrating a portion of a flexible duct in accordance with an advantageous embodiment.

With reference now to FIG. 6, a diagram illustrating a portion of a flexible duct is depicted in accordance with an advantageous embodiment. In this example, a portion of duct 400 is shown in a cross-sectional side view at end 412. In this illustration, cuff end 410 may be formed using conductive material 600, strap 602, strap 604, buckle 606, and buckle 608.

Conductive material 600, in this example, may be conductive on side 612, while being non-conductive on side 614 or conductive on both side 612 and side 614. In this example, side 612 may be electrically connected to pigtail 500. Conductive material 600 may be stitched or otherwise secured at regions 615 and 616. Further, conductive material 600 may be folded to provide additional electrical contact between side 612 and sides 618 and 620 of pigtail 500. In this example, a hoop may be received in channel 622 to form a mechanical and/or electrical connection with another flexible duct.

Material 402 may be a cloth coated material with neoprene. Materials that may be used include, for example, without limitation, neoprene, ureathane, polyester, or polyvinyl chloride (PVC) coated/laminated/bonded onto fiberglass/nylon mat/cloth. Conductivity may be produced by impregnating the cloth coating with carbon to allow no more than around 100 Meg Ohms of resistance. Of course, other materials, configurations, and/or amounts of resistance may be employed in other embodiments. For example, without limitation, material 402 may be an impregnated wire mesh.

Figure 7:
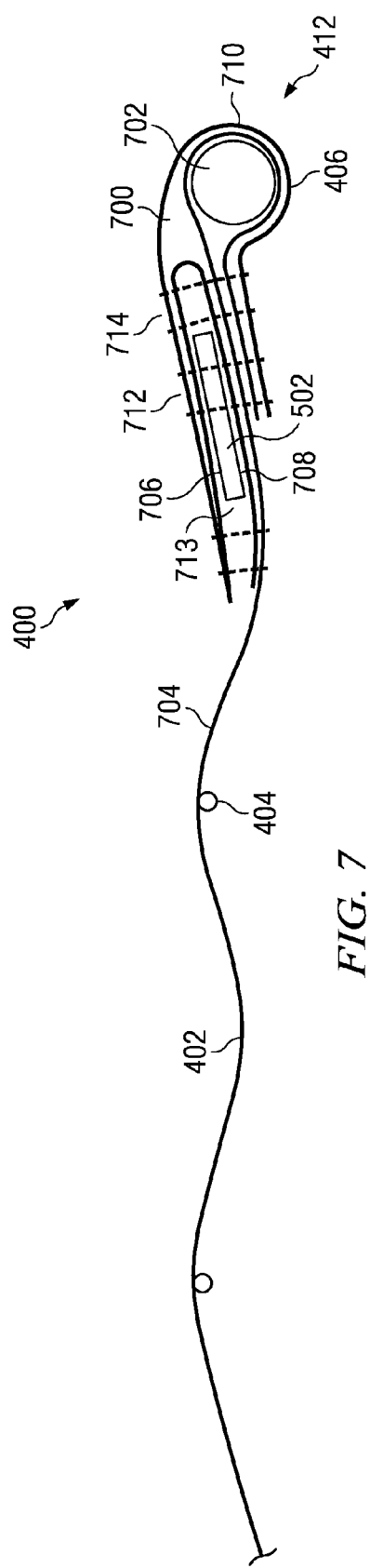
FIG. 7 is a diagram illustrating another portion of a flexible duct in accordance with an advantageous embodiment.

With reference now to FIG. 7, a diagram illustrating another portion of a flexible duct is depicted in accordance with an advantageous embodiment. In this example, flexible duct 400 is shown in a partial cross-sectional view around end 412 to illustrate an implementation of hoop end 406.

In this example, hoop end 406 may be formed with conductive material 700 and cable 702. Cable 702 may be, for example, without limitation, a wire rope, a metal cable, or some other suitable component. As illustrated, conductive material 700 may be folded over to contain cable 702 which may be part of helix 404.

Further, conductive material 700 may have side 704, which may be a conductive side for conductive material 700. Side 704 of conductive material 700 may be folded and/or configured to provide electrical contact to side 706 and side 708 of pigtail 502. Further, conductive material 700 may be configured such that side 710 also faces exterior 712. In this manner, exterior 712 of hoop end 406 may contact a conductive side on an interior portion of a cuff end, such as, for example, without limitation, cuff end 410.

Conductive material 700 may be secured to pigtail 502 around areas 712 and 714. Stitching may be used to secure conductive material 700. Although, in these examples, flexible duct 400 is shown having a circular channel, this illustration is not meant to limit the manner in which other flexible ducts may be configured. For example, without limitation, other flexible ducts may have a cross-section in the shape of a square, octagon, pentagon, or some other suitable shape.

Further, the different materials and forms of construction for flexible duct 400 as illustrated, in these examples, are not meant to limit the manner in which other flexible ducts may be constructed. Other flexible ducts may be constructed from other types of materials and/or configurations other than those illustrated in these examples.

Figure 8:
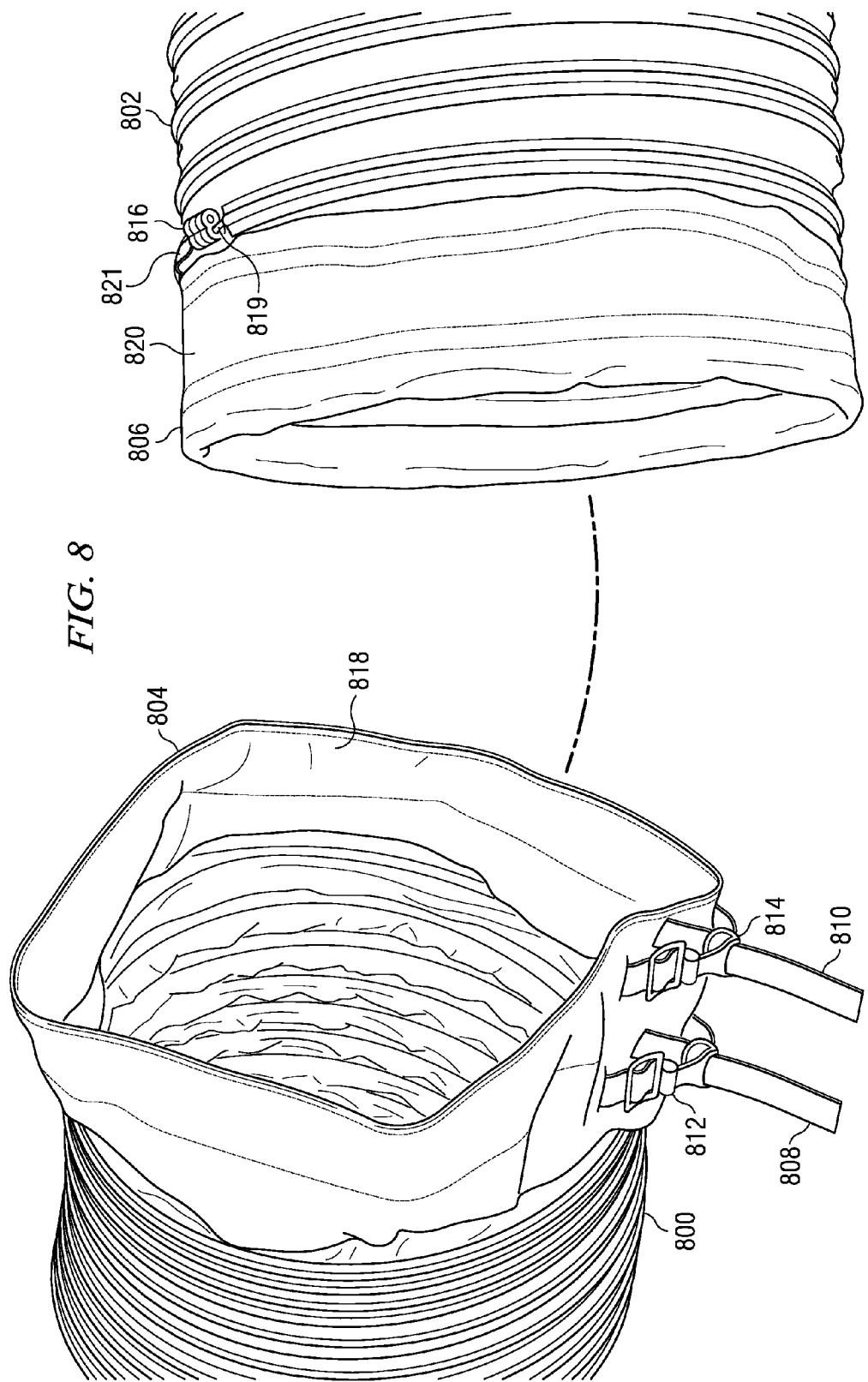
FIG. 8 is a diagram of two flex ducts in accordance with an advantageous embodiment.

With reference now to FIG. 8, a diagram of two flex ducts is depicted in accordance with an advantageous embodiment. In this example, a portion of flex duct 800 and a portion of flex duct 802 are illustrated. In this example, cuff end 804 of flex duct 800 may engage hoop end 806 of flex duct 802 to join these two flex ducts. The engagement may provide a mechanical and/or electrical connection between flex duct 800 and flex duct 802.

As illustrated, cuff end 804 includes strap 808, strap 810, buckle 812, and buckle 814. Further, flex duct 802 may include electrical cable connector 816. Electrical cable connector 816 may connect wire helix 819 and braided pigtail 821 to each other. In this example, inner surface 818 of cuff end 804 for flex duct 800 may be conductive. Outer surface 820 for hoop end 806 of flex duct 802 may be conductive.

Figure 9:
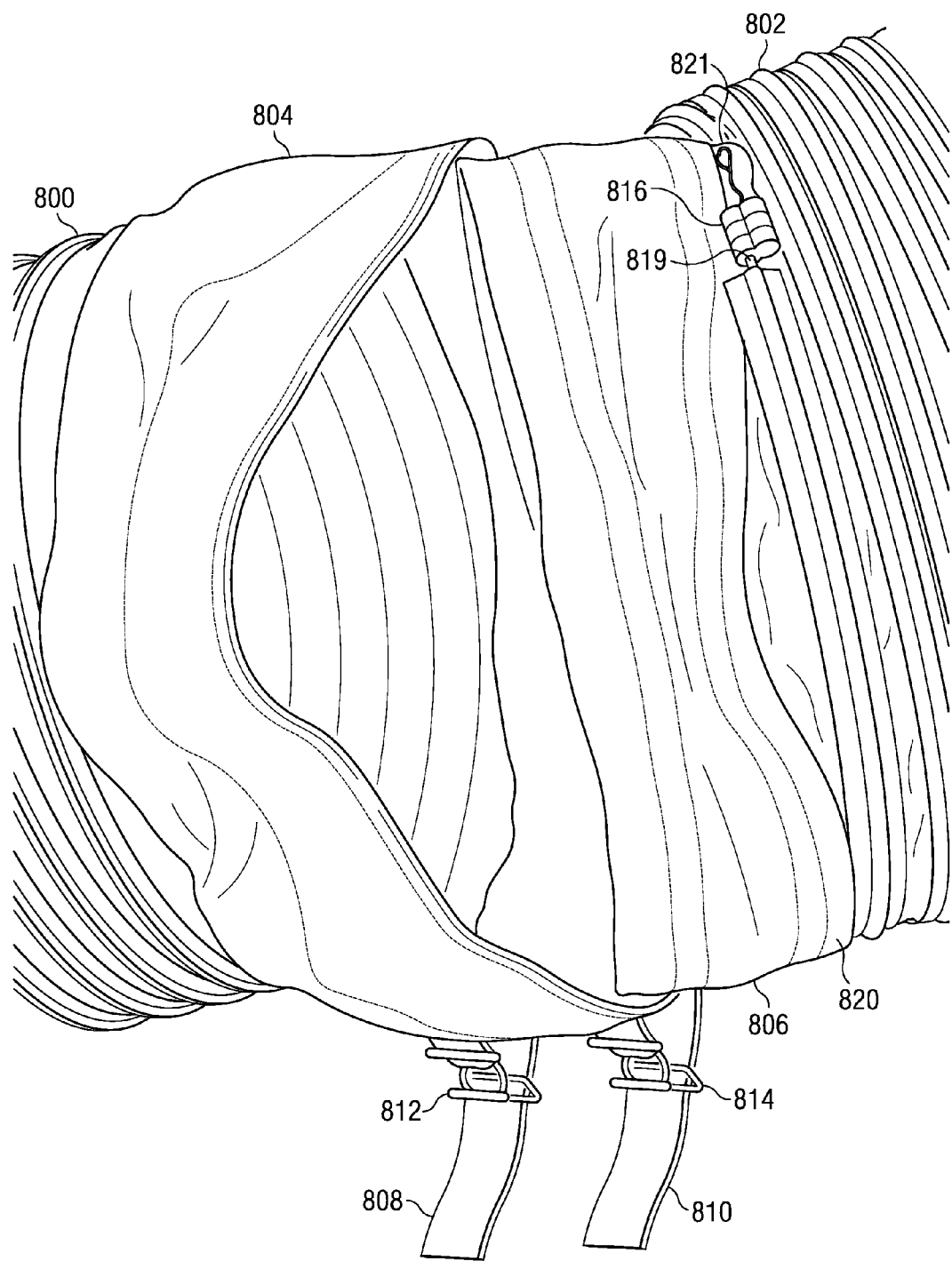
FIG. 9 is a diagram illustrating partial engagement of two flex ducts in accordance with an advantageous embodiment.

With reference now to FIG. 9, a diagram illustrating partial engagement of two flex ducts is depicted in accordance with an advantageous embodiment. As can be seen in this example, hoop end 806 may be inserted into cuff end 804 in these examples. In other words, hoop end 806 may be a male connector, while cuff end 804 may be a female connector. In this manner, inner surface 818 may contact outer surface 820 to form an electrical connection.

Figure 10:
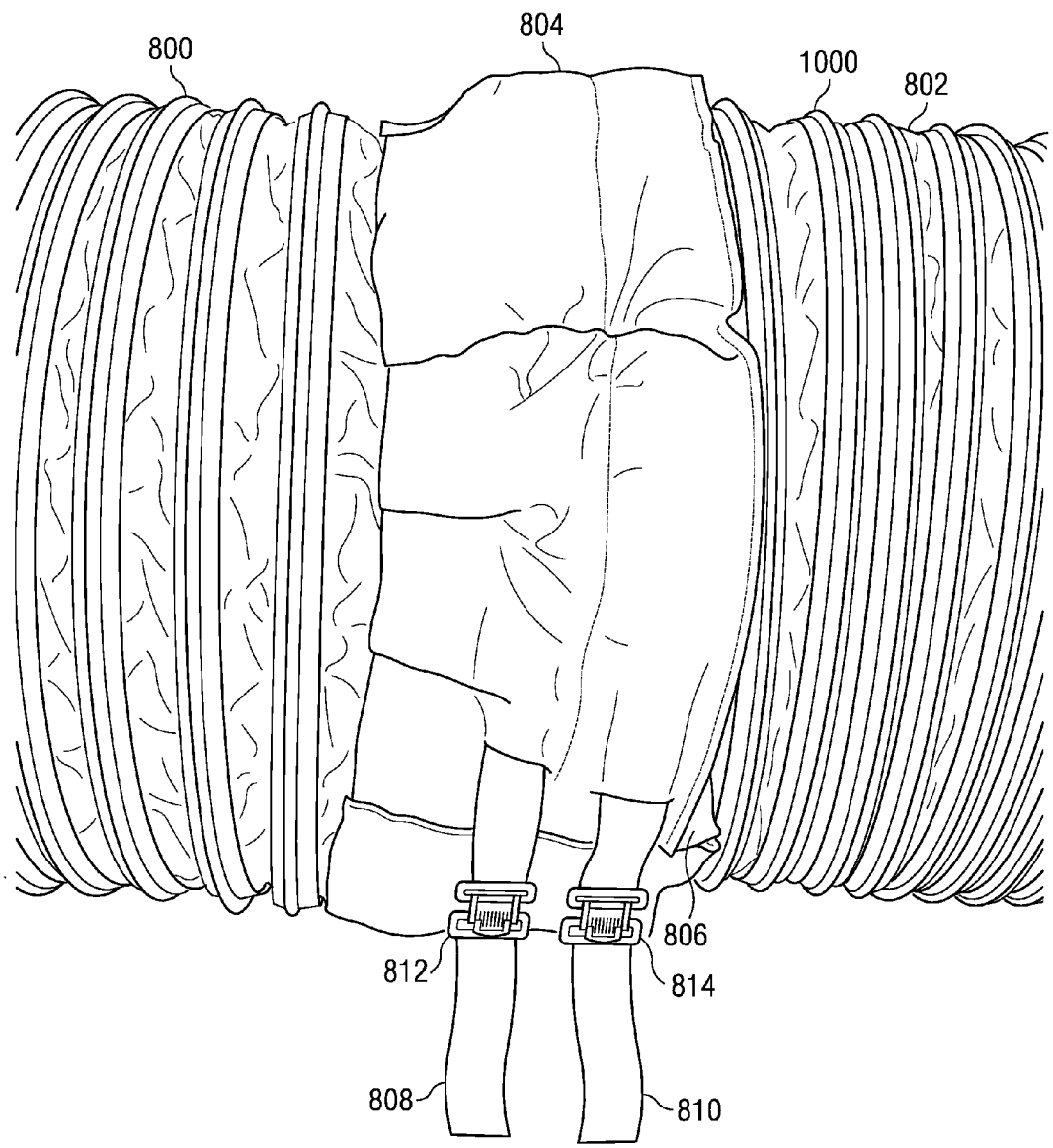
FIG. 10 is a diagram illustrating two flex ducts engaged to each other in accordance with an advantageous embodiment.

With reference now to FIG. 10, a diagram illustrating two flex ducts engaged to each other is depicted in accordance with an advantageous embodiment. In this example, flex duct 800 has been engaged or connected to flex duct 802. In particular, cuff end 804 has been placed over hoop end 806. This engagement causes inner surface 818 (not shown) of cuff end 804 to contact outer surface 820 (not shown) of hoop end 806.

In this manner, an electrical connection may be performed between flex duct 800 and flex duct 802. Further, a mechanical connection may be formed by the tightening of straps 808 and 810 on cuff end 804. The tightening of these straps in conjunction with the setting of buckles 812 and 814 may reduce the size of cuff end 804 to engage hoop end 802. Helix 1000 within hoop end 802 may prevent hoop end 802 from collapsing when cuff end 804 is tightened around hoop end 802.

In this manner, flexible ducts, such as, for example, without limitation, flexible duct 400 in FIG. 4, flexible duct 800 in FIG. 8, and flexible duct 802 in FIG. 8, may be used to provide an airway to move contaminated air from one area or location to another area or location. Further, the connection of these flexible ducts to each other also may provide an electrical path sufficient to dissipate static electricity that may build up in different regions or within the flexible ducts without the need for conductive metallic pigtails to be connected along with the flexible duct mating method for airflow conveyance.

Figure 11:
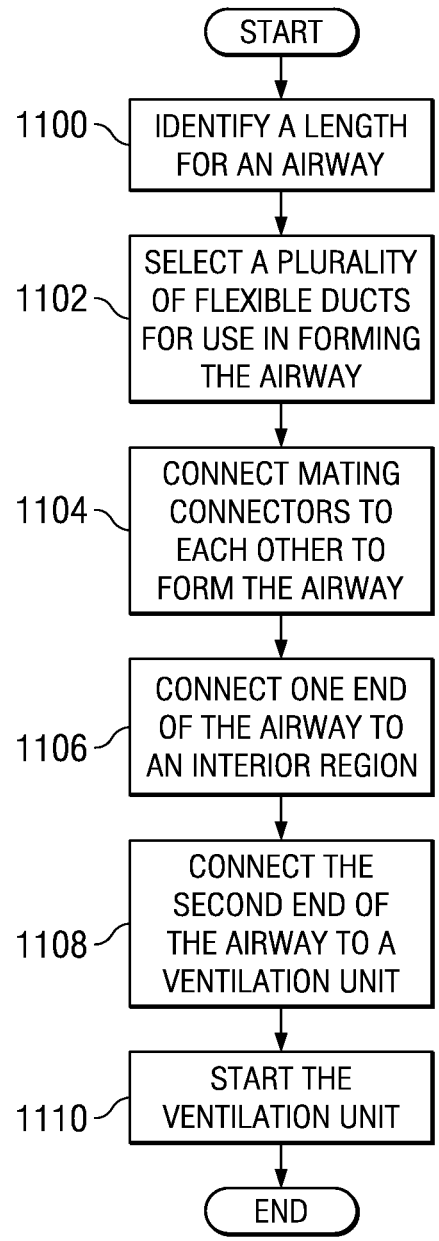
FIG. 11 is a flowchart of a process for forming an airway in accordance with an advantageous embodiment.

With reference now to FIG. 11, a flowchart of a process for forming an airway is depicted in accordance with an advantageous embodiment. The process begins by identifying a length for an airway (operation 1100). Next, the process selects a plurality of flexible ducts for use in forming the airway (operation 1102). In these examples, these flexible ducts may contain mating connectors, such as those described above.

The mating connectors may be connected to each other to form the airway (operation 1104). In this operation, a first mating connector may be connected to a second mating connector to form a mechanical and/or electrical connection. Thereafter, one end of the airway may be connected to an interior region (operation 1106). This interior region may be, for example, without limitation, a portion of an interior of an aircraft in which painting or other operations may occur.

The process may then connect a second end of the airway to a ventilation unit (operation 1108). The ventilation/exhaust unit is then started (operation 1110), with the process terminating thereafter. Operation 1100 may move contaminated air from an interior area, such as, for example, without limitation, interior area 310 in FIG. 3, through the airway formed by the flexible ducts to the ventilation unit for processing. In this manner, the contaminated air may be exhausted into another area, processed and recirculated into the interior area or exhausted to the outside ambient area of the facility.

In FIG. 11, the process of creating an airway also may create a mechanism for dissipating static electricity. This feature may be provided through electrically connecting the different flexible ducts to each other from the interior region to the ventilation unit. By dissipating static electricity, a possible ignition source of the ignitable contaminants may be reduced and/or eliminated.

Thus, the different advantageous embodiments provide a method and apparatus for a flexible duct that may be configured for various lengths. The flexible duct, in these examples, may be formed from multiple flexible ducts in which mating connectors may be used to connect the flexible ducts to each other to form a single flexible duct.

Further, these connections may include both mechanical and electrical connections. With the electrical connection, a capability to dissipate static electricity may be provided within the flexible duct, as well as in the area in which flammable vapors and/or mists may be generated.

As can be seen in these examples, the connectors are connected to each other without requiring more complicated steps in which pigtails may be twisted, connected with electrical connectors or tied to each other. Further, this type of airway may provide a more secure physical and electrical connection as compared to connecting flexible ducts to each other without connectors.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a wire frame;
    a material covering the wire frame to form a flexible duct having a first end and a second end, wherein the first end is configured to be a male mating connector configured to connect to a female mating connector of a second flexible duct, wherein the wire frame is electrically conductive, and wherein an outer surface of the first end is electrically conductive;
    a cable connector connected to the wire frame at about the first end; and a conductive pigtail connected to the cable connector and further connected to the material at about the first end; and
    a first conductive cloth attached to the material at about the first end, wherein the conductive pigtail is located within the first conductive cloth and the first conductive cloth has a conductive side in electrical contact with the conductive pigtail, wherein the first conductive cloth is configured to form an electrical connection between the male mating connector and the female mating connector.

2. The apparatus of claim 1, further comprising:
    a second wire frame;
    a second material covering the second wire frame to form the second flexible duct having a third end and a fourth end, wherein the third end is configured to be a female mating connector, wherein the female mating connector is connected to the male mating connector, wherein the second wire frame is electrically conductive, wherein an inner surface of the third end is electrically conductive, and wherein the inner surface is in electrical contact with the outer surface.

3. The apparatus of claim 2 wherein the female mating connector comprises a set of straps configured to secure the female mating connector to the male mating connector.

4. The apparatus of claim 1, wherein the conductive pigtail comprises a braided conductive pigtail.

5. The apparatus of claim 1, wherein the second end is configured to be a female mating connector configured to connect to a male mating connector of a third flexible duct, and wherein a second inner surface of the second end is electrically conductive.

6. The apparatus of claim 5, further comprising:
    a second cable connector connected to the wire frame at about the third end; and
    a second conductive pigtail connected to the second cable connector and further connected to the material at about the third end.

7. The apparatus of claim 1, further comprising:
    a second conductive pigtail connected to the wire frame at about the first end; and
    a second conductive cloth attached to the material at about the first end, wherein the second conductive pigtail is located within the second conductive cloth and the second conductive cloth has a conductive side in electrical contact with the second conductive pigtail, wherein the second conductive cloth is configured to form a mechanical and electrical connection to the female mating connector.

8. The apparatus of claim 7, wherein the first conductive cloth is configured such that the conductive side is exposed on an inner portion of the female mating connector.

9. The apparatus of claim 8, wherein the second conductive cloth is configured such that the conductive side is exposed on an outer portion of the male mating connector.

10. The apparatus of claim 1 further comprising:
    a ventilation unit connected to the flexible duct at the second end.

11. The apparatus of claim 10 further comprising:
    a filter attached to the flexible duct and configured to filter air moved through the flexible duct.

12. The apparatus of claim 1, wherein the wire frame is a helix.

13. A method comprising:
    providing a first flexible duct comprising a first wire frame and a material covering the first wire frame, wherein the flexible duct has a first end and a second end, wherein the first end is configured to be a male mating connector configured to connect to a female mating connector of a second flexible duct, wherein the first wire frame is electrically conductive, wherein an outer surface of the first end is electrically conductive, wherein the flexible duct further comprises a cable connector connected to the first wire frame at about the first end, and a conductive pigtail connected to the cable connector and further connected to the material at about the first end;
    providing the second flexible duct, the second flexible duct comprising a second wire frame and a second material covering the second wire frame, wherein the second flexible duct has a third end and a fourth end, wherein the third end is configured to be a female mating connector configured to connect to the male mating connector of the first flexible duct, wherein the second wire frame is electrically conductive, wherein a second outer surface of the third end is electrically conductive, wherein the second flexible duct further comprises a second cable connector connected to the second wire frame at about the third end, and a second conductive pigtail connected to the second cable connector and further connected to the second material at about the third end;
    connecting the first flexible duct and the second flexible duct to form an airway;
    the connecting is performed by inserting the male mating connector into the female mating connector; and
    the male mating connector includes a first conductive cloth attached to the material at about the first end, wherein the conductive pigtail is located within the first conductive cloth and the first conductive cloth has a conductive side in electrical contact with the conductive pigtail, wherein the first conductive cloth is configured to mechanically and electrically connect the male mating connector to the female mating connector.

14. The method of claim 13, wherein the airway dissipates static electricity.

15. The method of claim 13 further comprising:
connecting the second end to an interior area; and
connecting the fourth end to a ventilation unit.

16. The method of claim 13, wherein connecting further includes establishing an electrical connection between the outer surface and the inner surface.

17. The method of claim 16, wherein the female mating connector includes a set of straps and wherein connecting further includes using the set of straps to strap the third end onto the first end.

18. The method of claim 13, wherein
the female mating connector further includes a second conductive cloth attached to the second material at about the third end, wherein the second conductive pigtail is located within the second conductive cloth and the second conductive cloth has a conductive side in electrical contact with the second conductive pigtail, wherein the second conductive cloth is configured to mechanically and electrically connect the female mating connector to the male mating connector.

19. The method of claim 13, further comprising:
attaching the second end to a ventilation unit;
attaching the fourth end to a first space to be ventilated; and
using the ventilation unit to vent a gas from the first space, thorough the airway, and to a second space.

20. The method of claim 13, further comprising:
attaching the fourth end to a ventilation unit;
attaching the second end to a first space to be ventilated; and
using the ventilation unit to vent a gas from the first space, thorough the airway, and to a second space.

* * * * *